June 6, 1961 W. F. STEAGALL 2,987,252
SERIAL BINARY ADDERS
Filed Dec. 1, 1954 5 Sheets-Sheet 1

INVENTOR
WILLIAM F. STEAGALL

BY Emory Light
ATTORNEY

June 6, 1961 W. F. STEAGALL 2,987,252

SERIAL BINARY ADDERS

Filed Dec. 1, 1954 5 Sheets-Sheet 2

INVENTOR

WILLIAM F. STEAGALL

BY E. Jerry Light

ATTORNEY

INVENTOR
WILLIAM F. STEAGALL

BY [signature]
ATTORNEY

INVENTOR
WILLIAM F. STEAGALL
BY [signature]
ATTORNEY

INVENTOR
WILLIAM F. STEAGALL

BY E. Jerry Light
ATTORNEY

2,987,252
SERIAL BINARY ADDERS

William F. Steagall, Merchantville, N.J., assignor to Sperry Rand Corporation, a corporation of Delaware Filed Dec. 1, 1954, Ser. No. 472,289
8 Claims. (Cl. 235—176)

The present invention relates to computing apparatuses and is more particularly concerned with devices capable of performing full serial addition in binary digital applications. In particular, the present invention is primarily concerned with the provision of serial adders utilizing magnetic amplifiers preferably of the pulse type.

The process known as binary addition, and in particular serial addition of binary numbers, is well known in the computing art and units capable of performing such serial binary addition ordinarily comprise a basic portion of more complex computation devices. In the past, serial adders have ordinarily employed vacuum tube circuitry and have accordingly been subject to the disadvantages that they are relatively fragile and subject to breakage and to normal operating failures; and further that they have been relatively large in size. These factors raise serious questions in respect to disposition of components as well as of maintenance and the cost attendant thereto.

The present invention serves to obviate the foregoing difficulties and in essence provides serial adder structures capable of performing full addition of binary numbers and utilizing magnetic amplifiers as a basic portion thereof.

It is accordingly an object of the present invention to provide improved serial adders for use in computing applications.

A further object of the present invention resides in the provision of serial adders for binary digital numbers employing magnetic amplifiers as components thereof.

Still another object of the present invention resides in the provision of improved serial adders which are more rugged in construction and which are less subject to operating failures than has been the case heretofore.

A still further object of the present invention resides in the provision of serial adders which may be made in relatively small sizes.

Another object of the present invention resides in the provision of a computation device comprising, in combination, a plurality of magnetic amplifiers so interconnected that the mathematical process known as binary addition may be performed electrically.

A still further object of the present invention resides in the provision of a computation device employing magnetic amplifiers and capable of accepting plural serial trains of pulses representative respectively of binary digital numbers, the said computation device being adapted to provide an output train of signals characteristic of the sum of the said serial input trains.

In providing for the foregoing objects and advantages, the present invention utilizes a plurality of magnetic amplifiers interconnected to form half adder devices and the said half adder devices are in turn interconnected through further magnetic amplifiers to effect a full adder capable of performing serial binary addition. In one form of my invention, the serial adder so formed operates to provide a sum output representative of the electrical summation of a pair of input trains of serial pulses representative of binary digital numbers. In another form of my invention, the serial adder is adapted to provide a complement output of the summation of the said input trains.

Before proceeding with a detailed description of my invention, several definitions of the subject matter to be discussed are advisable. In the practice of my invention I utilize both complementing and non-complementing magnetic amplifiers. A complementing magnetic amplifier is, by definition, one which will give an output when no input is presented thereto, or on the contrary, one which gives no output when there is in fact an input. Again, by definition, a non-complementing amplifier is one which will give an output only when an input is presented thereto.

The several amplifiers comprising the serial adders of my invention are energized by "power pulses." These pulses are preferably in the form of regularly occurring positive and negative going square waves. In the precise disposition of components, some amplifiers will be fed by "phase one power pulses" and this term merely refers to such positive and negative going square waves timed with respect to an arbitrary datum. Other of the amplifiers will utilize "phase two power pulses" and it is to be understood that this latter term again refers to pulses of the same form as phase one power pulses timed again with respect to the same arbitrary datum, but so displaced with respect to said datum that a positive going portion of a phase one power pulse will coincide with a negative going portion of a phase two power pulse and vice versa. Again, it will become apparent from the following description that the several power pulses cooperate with input pulses to selectively produce or inhibit an output from the magnetic amplifier concerned. These input pulses ordinarily, but not necessarily, occur during a negative going portion of the corresponding power pulse applied to the said amplifier (or during a positive going power pulse portion, if the power winding and the power winding diodes are reversely connected) and in this respect therefore when I speak of a "phase one input pulse" it is to be understood that this term refers to an input pulse capable of cooperating with a magnetic amplifier energized by phase one power pulses. Similarly, a "phase two input pulse" is one capable of cooperating with a magnetic amplifier energized by phase two power pulses. A phase one input pulse cannot effectively cooperate with a phase two power pulse, nor can a phase two input pulse effectively cooperate with a phase one power pulse.

The foregoing objects, advantages and operation of my invention will become more readily apparent from the following description and accompanying drawings, in which.

Figure 1:
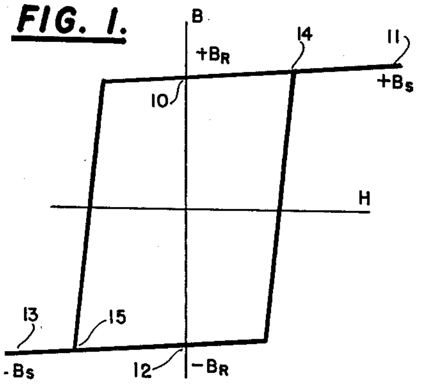
FIGURE 1 is an idealized hysteresis loop of a magnetic material which may preferably be employed in the cores of the magnetic amplifiers utilized in my invention.

Referring now to FIGURE 1, it will be seen that the magnetic amplifiers of my invention may preferably, but not necessarily, utilize magnetic cores exhibiting a substantially rectangular hysteresis loop. Such cores may be made of a variety of materials, among which are various types of ferrites and various kinds of magnetic tapes including Orthonik and 4–79 Moly-permalloy. These materials may be given different heat treatments to effect different desired properties. In addition to the wide variety of materials applicable, the cores of the magnetic amplifiers to be discussed may be constructed in a number of different geometries including both closed and open paths. For example, cup-shaped cores, strips of material, or toroidal cores are possible. It must be emphasized that the present invention is not limited to any specific geometries of its cores, nor to any specific materials therefor; and the examples to be given are illustrative only.

In the following description bar type cores have been utilized for ease of representation and for facility in showing winding directions. The bar type cores shown may in fact be considered to represent the end view of a toroidal core. Further, the following description refers to the use of materials having substantially rectangular hysteresis loops; this is again for ease of discussion. However, neither the precise core configuration nor the precise hysteretic character of core material is mandatory; and many variations will readily suggest themselves to those skilled in the art.

Returning now to the hysteresis loop shown in FIGURE 1, it will be noted that the curve exhibits several significant points of operation, namely, point 10 ($+B_r$) which represents a point of plus remanance; the point 11 ($+B_s$) which represents plus saturation; the point 12 ($-B_r$) which represents minus remanence; the point 13 ($-B_s$) which represents minus saturation; the point 14 which represents the beginning of the plus saturation region; and the point 15 which represents the beginning of the minus saturation region. Discussing for the moment the operation of a device utilizing a core which exhibits a hysteresis loop such as is shown in FIGURE 1, let us assume that a coil is wound on the said core. If we should initially assume that the core is at an operating point 10 (plus remanence), and if a voltage pulse is applied to the coil which produces in the said coil a current creating a magnetomotive force in a direction tending to increase the flux in the said core (i.e. in a direction of +H), the core will tend to be driven from point 10 ($+B_r$) to point 11 ($+B_s$). During this state of operation there is relatively little flux change through the said coil and the coil therefore presents a relatively low impedance whereby energy fed to the said coil during this state of operation will pass readily therethrough and may be utilized to effect a usable output.

Figure 4:
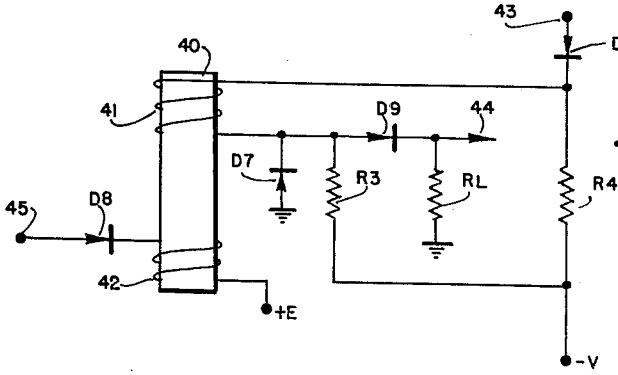
FIGURE 4 is a schematic representation of a basic non-complementing amplifier of the magnetic type.

On the other hand, if the core should initially be at point 12 ($-B_r$) prior to the application of the said +H pulse, upon application of such a pulse the core will tend to be driven from the said point 12 ($-B_r$) to the region of plus saturation. The pulse magnitude should preferably be so selected that the core is driven only to the beginning of the plus saturation region, point 14. During this particular state of operation there is a very large flux change through the said coil and the coil therefore exhibits a relatively high impedance to the applied pulse. As a result, substantially all the energy applied to the coil, when the core is initially at $-B_r$, will be expended in "flipping" the core from point 12 to the region of plus saturation (preferably to point 14), and thence to point 10, with very little of this energy actually passing through the said coil to give a usable output. Thus, depending upon whether the core is initially at point 10 ($+B_r$), or at point 12 ($-B_r$), an applied pulse in the +H direction will be presented respectively with either a low impedance or a high impedance and will effect either a relatively large output or a relatively small output. These considerations are of great value in the construction of the magnetic amplifiers utilized in the present invention, such as are shown in FIGURES 2 and 4.

Figure 3:
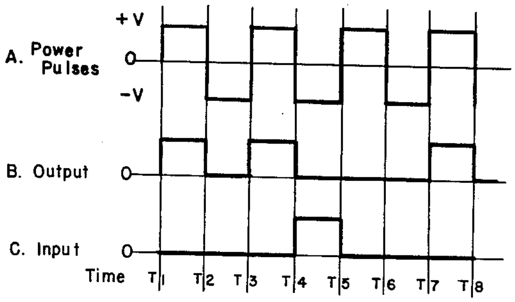
FIGURE 3 (A, B and C) are waveforms illustrating the operation of the complementing magnetic amplifier shown in FIGURE 2.
Figure 2:
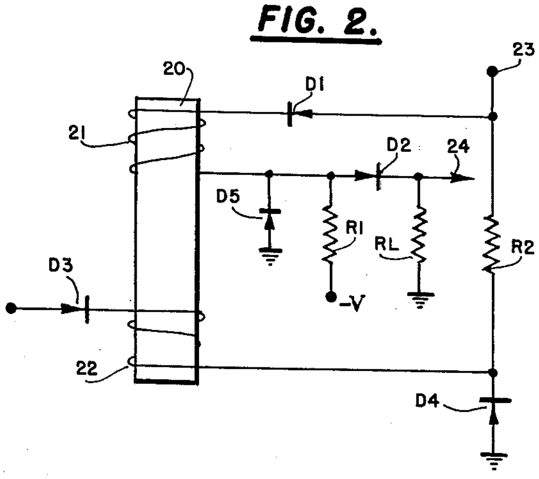
FIGURE 2 is a schematic representation of a simple complementing amplifier of the magnetic type.

Referring now to FIGURES 2 and 3, it will be seen that a complementing magnetic amplifier, provided in accordance with the present invention, comprises a core 20 preferably but not necessarily exhibiting a hysteresis loop similar to that discussed in reference to FIGURE 1. The core 20 bears two windings thereon, namely, a winding 21 which is termed the power or output winding, and a signal or input winding 22. One end of the power winding 21 is coupled to a diode D1, poled as shown, and the diode D1 is in turn connected to an input terminal 23 supplied with a train of positive and negative going power pulses such as is shown in FIGURE 3A. The power pulses shown preferably, but not necessarily, have a center value of "0" volts and exhibit excursions between plus and minus V volts. Assuming now that the core is initially at plus remanence (point 10 of FIGURE 1), a positive going power pulse applied at terminal 23 during the time $t1$ to $t2$ will cause current to pass through the diode D1, through the relatively low impedance exhibited by power winding 21 and thence through diode D2 and load resistor RL to ground. Because of the low impedance exhibited by coil 21, a substantial output pulse will therefore appear at the terminal 24 during the time $t1$ to $t2$. At time $t2$, and in the absence of any signal input, the core will return to the operating point 10 (shown in FIGURE 1) and the next positive going power pulse applied during the time $t3$ to $t4$, for instance, will again drive the core to plus saturation, again giving an output during this time $t3$ to $t4$. Thus, in the absence of any other inputs, if the core 20 should initially be at plus remanence, successive positive going power pulses will cause successive outputs to appear at output terminal 24.

Let us now assume, however, that an input pulse is applied during the time $t4$ to $t5$, such as is shown in FIGURE 3C. This input pulse causes current to pass through the diode D3 and through coil 22 and, as will be noted from FIGURE 2, inasmuch as the said coil 22 is wound in a direction opposite to that of coil 21, the said input pulse will effect a —H magnetizing force on the core 20. Thus, during the time $t4$ to $t5$, the application of an input pulse, as described, will cause the core 20 to be flipped in a counterclockwise direction from its plus remanence operating point to the region of its minus remanence operating point (point 10 to point 15, to point 12 of FIGURE 1) and at time $t5$ the core 20 will find itself at the operating point 12, $-B_r$, preparatory to the reception of the next positive going power pulse applied during the time $t5$ to $t6$. This next positive going power pulse will thus find the coil 21 to present a relatively high impedance and, as a result, substantially all of the energy presented by the power pulse will be expended in flipping the core back to the region of point 10 ($+B_r$), via point 14, rather than in producing a usable output. Thus, as will be seen from an examination of FIGURE 3, the application of an input pulse during the occurrence of a negative going portion of the applied power pulses will effectively prevent the output of a usable pulse during the next succeeding positive going power pulse. The system thus acts as a complementer.

While the foregoing discussion has described in essence the operation of a complementing magnetic amplifier in accordance with the present invention, several further design considerations should be noted. First of all, even though, during the time $t5$ to $t6$ for instance, the energy in the positive going power pulse is expended in merely flipping the core from $-Br$ to $+Br$, a small output termed a sneak output, may still appear across RL. Such sneak outputs are effectively suppressed by the combination of resistor R1 and diode D5 connected as shown in FIGURE 2. This suppression is effected by so choosing the magnitude of resistor R1 that a current flows through the said diode D5 and resistor R1 to a source of negative potential $-V$, which current is equal to or greater than the magnitude of the sneak pulse current to be suppressed. Because of the operation of diode D5 and resistor R1 therefore, only outputs larger than that of the sneak output may appear at output 24.

Again, the passage of energy through power winding 21 due to the application of a positive going power pulse at the terminal 23, will cause a flux change to occur in the coil 21 as described, and this flux change will in turn tend to induce a voltage in the signal coil 22. This induced voltage is negative at the cathode of D3 and positive at the cathode of D4, and although the induced voltage is small if the core 20 is at point 10 ($+Br$) when the positive going power pulse is applied, it is nevertheless necessary to prevent current from flowing in the signal winding 22 due to this small induced voltage. The combination of resistor R2 and diode D4 accomplishes this function by allowing the lower end of signal winding 22, connected to the junction of the said resistor R2 and diode D4, to attain the power pulse potential when the power pulse is positive. Since the base level of an input pulse, as applied through diode D3, is "0" volts, no current can flow due to the small induced voltage discussed previously. Further, if the core 20 should initially be at $-Br$, upon application of a positive going power pulse, a relatively large flux change occurs in the core and a relatively large voltage will be induced in the lower winding 22. The blocking action of the R2–D4 circuit still prevents current from flowing in the said lower winding 22 if there are fewer turns on signal winding 22 than are on power winding 21. It is well known in the art that this relationship between the number of turns on the windings must exist if a voltage gain is to be produced by the amplifier.

Finally, it should be noted that when a power pulse, such as is shown in FIGURE 3A, is negative going, only a negligible current can flow in diode D1. In this respect it has been assumed that the back resistance of the several diodes shown is infinite and that the forward resistance is zero. While this is not strictly true, these assumptions are convenient and do not substantially affect the explanation. Even though no current flows through the diode D1 during the application of a negative going portion of the power pulse, current flows in the R2–D4 circuit, the magnitude of this current being approximately $$\frac{V}{R2}$$

This current serves to hold the end of signal winding 22 connected to the junction of resistor R2 and diode D4 at approximately ground potential, and as a result signal inputs applied through the diode D3 during a negative going power pulse portion pass through the said diode D3, through winding 22, as previously discussed, to the junction of resistor R2 and diode D4, which junction is approximately at ground potential. It should further be noted that the current which flows as a result of an input pulse through diode D3 must produce sufficient magnetizing force to flip core 20 from plus remanence to minus remanence during the input pulse period. This value of current must not exceed the magnitude $$\frac{V}{R2}$$

but this condition is easily arranged by proper choice of resistor R2.

Summarizing the foregoing briefly, it will be seen that the circuit of FIGURE 2 provides a complementing magnetic amplifier wherein outputs will appear from the said amplifier so long as no input signal is presented thereto during negative going portions of the power pulses applied. Such a complementing magnetic amplifier may be utilized as a portion of the serial adders in accordance with the several embodiments of the present invention. Before proceeding with the description of these serial adders, however, let us examine the construction and operation of a non-complementing magnetic amplifier such as may be utilized in the present invention.

Figure 5:
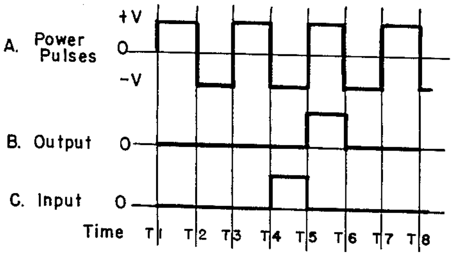
FIGURE 5 (A, B and C) are waveforms illustrating the operation of a non-complementing magnetic amplifier of the type shown in FIGURE 4.

Referring now to the circuit shown in FIGURE 4, and making reference to the waveform diagrams of FIGURE 5 (A through C), it will be seen that a non-complementing amplifier in accordance with the present invention utilizes a magnetic core 40, again preferably but not necessarily exhibiting a hysteresis loop substantially the same as that shown in FIGURE 1. The core 40 again carries two windings thereon, namely, a power or output winding 41 and a signal or input winding 42. One end of the power winding 41 is coupled through a diode D6, poled as shown, to a source of positive and negative going power pulses such as is shown in FIGURE 5A. For the purposes of the following discussion, the power pulses are again assumed to have a center value of "0" volts and to exhibit excursions between plus and minus V volts. Assuming now that the core 40 is initially at $-Br$, point 12 of FIGURE 1, application of a positive going power pulse during the time $t1$ to $t2$, at power input terminal 43, will cause a current to flow through the diode D6 to winding 41 and thence through diode D9 and resistor RL, to ground. Inasmuch as this energy is for the most part expended in flipping the core from $-Br$ (point 12 of FIGURE 1) to $+Br$ (point 10 of FIGURE 1), only a sneak output at best will appear across the load resistor RL, and this sneak output is again effectively suppressed by the combination of resistor R3 and diode D7, as was discussed in reference to FIGURE 2. Thus, during the time $t1$ to $t2$ the applied positive going power pulse merely succeeds in flipping the core from $-Br$ to $+Br$ and, due to the sneak suppression by diode D7 and resistor R3, no output will appear at terminal 44.

During the period $t2$ to $t3$, a negative going power pulse is applied to terminal 43 and this applied pulse effectively causes diode D6 to cut off. During this period of time, a reverse current flows through the power winding 41 from ground through diode D7, through the said winding 41 and thence through resistor R4 to the source of negative potential $-V$. The value of this current is substantially $$\frac{V}{R4}$$

and R4 is so chosen that the current flow in the reverse direction through coil 41 is sufficient to flip the core during the time period $t2$ to $t3$ from $+Br$ back to $-Br$ in a counter-clockwise direction. Thus, at time $t3$, the core once more finds itself at its $-Br$ operating point and a further positive going power pulse applied at terminal 43 during the time $t3$ to $t4$ will again merely flip the core to the $+Br$ operating point without effecting an output. In the absence of any other input signals, therefore, the core is regularly flipped between $-Br$ and $+Br$ and back to $-Br$ without there being any output.

If we should now assume that an input pulse, as shown in FIGURE 5C, should be applied to input terminal 45 during the time period $t4$ to $t5$, this input pulse will cause current to flow through the winding 42 via diode D8 and will subject the core 40 to a supplemental magnetizing force. As will become apparent from an examination of the winding directions shown in FIGURE 4, the magnetizing force effected by coil 42 during the time $t4$ to $t5$ is in a direction opposite to that effected by the reverse current flow through coil 41 during this same time period. The magnetizing effect of the said reverse current flow through winding 41 is thereby effectively nullified and, therefore, at the end of the $t4$ to $t5$ time period, the core remains at the operating point $+Br$. Application of a further positive going power pulse during the time $t5$ to $t6$ will therefore cause a substantial output to appear across load resistor RL, and at output terminal 44. If no further input pulse should be applied during the time $t6$ to $t7$ the reverse current flow through winding 41 will again cause the core to flip back to the $-Br$ point, no output will appear during the time $t7$ to $t8$, etc. Thus, the arrangement shown in FIGURE 4 permits an output to appear across resistor RL during the application of a positive going power pulse only if an input were applied at the terminal 45 during the next preceding negative going power pulse.

One other design consideration should be noted. Current flow through the winding 41 will, in the absence of other circumstances, establish flux changes tending to induce a voltage in the signal input coil 42. In order to protect the input circuit connected to diode D8 against any interference from current flowing in the power winding 41, the signal winding 42 is returned to a positive voltage +E, as shown, which positive voltage is equal and opposite in value to the voltage induced or generated in it by current flowing in the power winding 41 when reverse current flows through the said winding 41.

Figure 6:
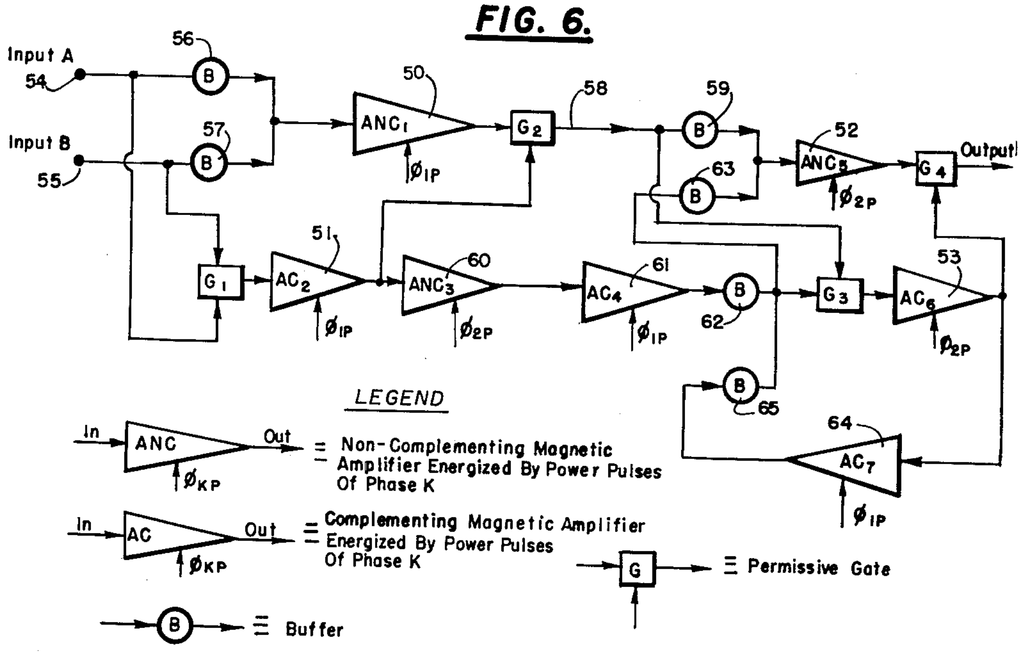
FIGURE 6 is a logical diagram of one form of serial adder for binary numbers in accordance with the present invention and includes a legend descriptive of the symbols used therein.

Referring now to FIGURE 6, one form of serial adder in accordance with the present invention has been illustrated and it will be seen that the particular serial adder shown therein comprises plural magnetic amplifiers operating in accordance with the preceding discussion. The particular arrangement shown in FIGURE 6 comprises two half adders of the type disclosed in the prior copending application of H. W. Kaufmann, Serial No. 423,422, filed April 15, 1954, now Patent No. 2,913,593, for "Half Adder For Computers," (EM–57). This prior copending application has been assigned to the assignee of the instant case and discloses, in general, half adder structures comprising two gates in combination with a complementing and a non-complementing magnetic amplifier.

Thus, referring to FIGURE 6, it will be seen that a first half adder, of the type disclosed previously, comprises a non-complementing magnetic amplifier 50, a complementing amplifier 51 and two gates G1 and G2. A second half adder of the type disclosed previously comprises a further non-complementing magnetic amplifier 52, a complementing magnetic amplifier 53 and two further gates G3 and G4. In accordance with the arrangement shown, a first serial train of pulses representative of a binary digital number may be coupled to the adder, at an input terminal 54, termed "input A," while a further train of serial pulses representative of a further binary number may be coupled to the input terminal 55, termed "input B." The input A train is coupled from the terminal 54 to the input of non-complementing magnetic amplifier 50 via a buffer 56 and is also coupled to one input terminal of the gate G1. Similarly the input B terminal 55 is coupled via the buffer 57 to the input of the said amplifier 50 and to the other input terminal of the gate G1. The output of gate G1 is coupled to the input of complementing amplifier 51. The output of the said amplifier 51, as well as the output of non-complementing magnetic amplifier 50, are coupled respectively to the inputs of the gate G2. The output of gate G2, appearing on the line 58, comprises a binary sum of the first half addition and is coupled via the buffer 59 to the input of non-complementing amplifier 52 as well as to one input of the gate G3. The output of complementing amplifier 51 is representative of the complement of the carry of the first half addition and the said output of amplifier 51 is fed not only to an input of gate G2 but also to the input of a non-complementing amplifier 60 and thence via further complementing amplifier 61 and buffers 62 and 63 to an input of gate G3 and to the input of the non-complementing amplifier 52. The output of the complementing amplifier 53 is, as shown, coupled to an input of the gate G4 and also to the input of a further complementing magnetic amplifier 64, and the output of the said amplifier 64 is fed, via a buffer 65, to an input of gate G3, and, via the buffer 63, to the input of non-complementing magnetic amplifier 52.

The operation of a half adder of the previously disclosed type may be seen from a brief examination of the circuit components comprising, for instance, the first half adder discussed. It will be seen that in the absence of an input to the complementing amplifier 51, the said amplifier 51 will produce a regularly occurring pulsed output, which output is coupled to one input of the gate G2 thereby to condition the said gate G2 to pass any pulses appearing from the output of the non-complementing amplifier 50. If an input pulse should appear at the terminal 54, for instance, without there being a corresponding input pulse at the terminal 55, the input A pulse so provided will cause non-complementing amplifier 50 to produce an output pulse which will pass through the gate G2 to the output line 58. Similarly, if a pulse should be applied to the terminal 55, again without there being a corresponding pulse at the input A terminal 54, this input B pulse will also cause the non-complementing amplifier 50 to produce a further output pulse on the line 58 via the gate G2. If, however, simultaneous pulses should be applied to the input A and input B terminals 54 and 55, these two input pulses will be coupled to the input of gate G1 and will cause the said gate G1 to pass a pulse to the input of complementing amplifier 51. Amplifier 51 will, as a result, produce no output pulse in the next succeeding time period whereby the gate G2 will not be conditioned to pass an output pulse from the non-complementing amplifier 50.

Summarizing the foregoing, it will be seen that when a pulse is coupled to one only of the input A or input B terminals, an output pulse (representative of a binary sum of 1 and 0) will appear on the line 58, while a further output pulse (representative of a complemented carry of a binary summation of 1 and 0) will appear at the output of amplifier 51. If pulses should be applied simultaneously to the input A and input B terminals 54 and 55, there will be no output on the line 58 (representative of a binary summation of 1 and 1) and there will be no output pulse from the complementing amplifier 51 (representative of a complemented carry of a binary summation of 1 plus 1). By a similar analysis, the operation of the amplifiers 52 and 53, in conjunction with the gates G3 and G4, will be seen to correspond to a further half addition.

The two half adders discussed previously are interconnected as shown with three further magnetic amplifiers 60, 61 and 64. The two complementing amplifiers 61 and 64 serve both as logical delay elements and as complementers of the carry signals from the first and second half adders respectively. The non-complementing amplifier 60 serves as a delay means. Referring briefly to the discussion with respect to FIGURES 4 and 5, it will be noted that an input pulse to a non-complementing magnetic amplifier produces an output pulse during the next succeeding time interval. As a result, it may be stated that a non-complementing amplifier in this respect acts as an active delay means. It should be noted, therefore, that while FIGURE 6, for instance, has utilized three non-complementing magnetic amplifiers, namely, amplifiers 50, 52 and 60, each of these amplifiers may, if desired, be replaced by a suitable passive delay means. This simple substitution may in fact be effected in each of the embodiments of the present invention to be discussed, wherever a non-complementing magnetic amplifier has been shown, and therefore in the subsequent description and appended claims the term "non-complementing amplifier" is meant to include within its scope other forms of active or passive delay means.

Figure 7:
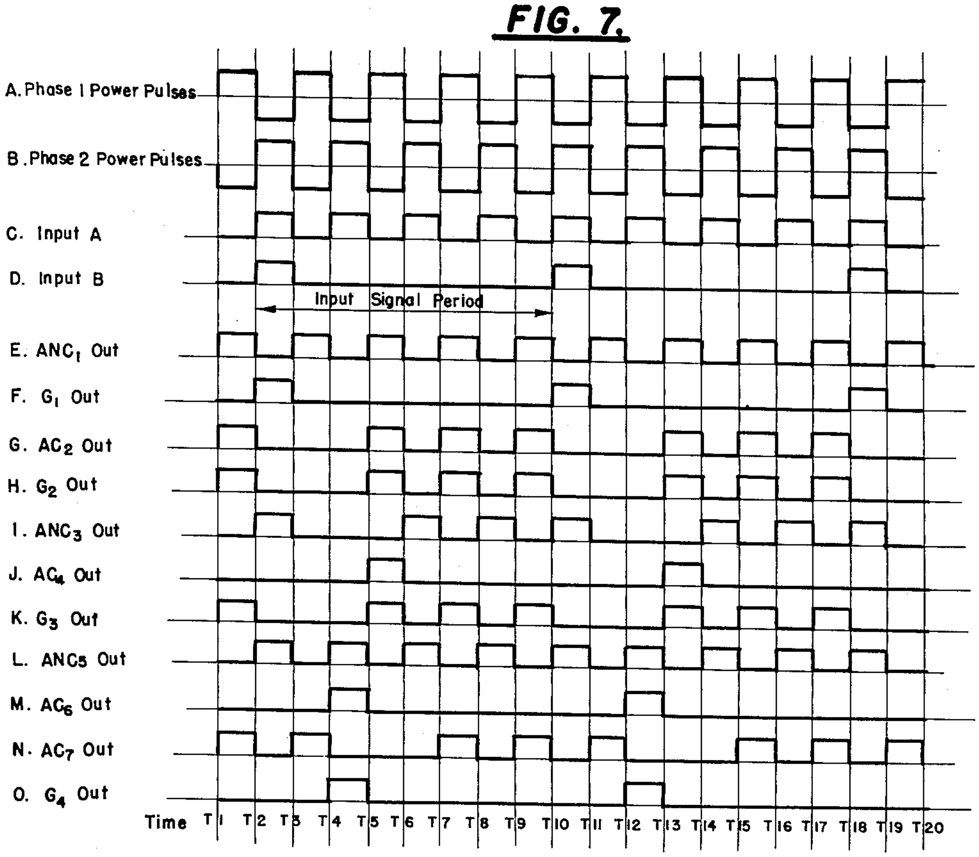
FIGURE 7 (A through O inclusive) are waveforms illustrating the operation of the serial adder shown in FIGURE 6.

The operation of the circuit shown in FIGURE 6 may be seen from an examination of the waveforms of FIGURE 7. In particular, it has been assumed, for purposes of explanation only, that the input A and input B pulses applied respectively to the terminals 54 and 55, are periodic in nature. Thus, referring to FIGURE 7C, the assumed input A comprises a series of regularly occurring pulses, while the input B shown in FIGURE 7D comprises a single input pulse coinciding with the first pulse of the input A series of pulses. The input signal period assumed for purposes of the present discussion, comprises the time interval $t2$ to $t10$, for instance.

The result of the first half addition may be seen from an examination of FIGURES 7H and 7G. It will be seen that due to the coincidence of input A and input B pulses during the time interval $t2$ to $t3$ there is no output from the gate G2 during the time interval $t3$ to $t4$; there is, however, an output from the said gate G2 during the time intervals $t5$ to $t6$, $t7$ to $t8$, and $t9$ to $t10$, due respectively to the input A pulses appearing during the intervals $t4$ to $t5$, $t6$ to $t7$, and $t8$ to $t9$. Similarly, the complemented carry output of amplifier 51 (FIGURE 7G), is represented by a no-pulse output during the time interval $t3$ to $t4$, and by pulse outputs occurring during the time intervals $t5$ to $t6$, $t7$ to $t8$ and $t9$ to $t10$. This complemented carry output is further complemented by the amplifier 61 to provide a true carry output and, as will be seen from an examination of FIGURE 7J, for instance, this true carry output comprises, for the assumed signal inputs, an output pulse occurring once during a given input signal period.

If we should now assume that the first half addition is complete, we may examine the operation of the device shown in FIGURE 6 from the point of occurrence of the coincident signals from the gate G2 and the complementing amplifier 61. Such a coincidence occurs, for instance, during the time interval $t5$ to $t6$, and this pulse coincidence opens the gate G3 (FIGURE 7K), producing an output pulse during the time interval $t5$ to $t6$ which sets the complementing amplifier 53 and prevents any output therefrom during the time interval $t6$ to $t7$ (FIGURE 7M). Complementing amplifier 64 therefore produces an output pulse during the time interval $t7$ to $t8$ (FIGURE 7N), and the output of the said amplifier 64 again coincides with an output from the gate G2. The same sequence of operation therefore is repeated and this repetition continues until the missing pulse from the gate G2 output is reached. Thus, two further pulse outputs from the gate G3 are achieved, making a total of three pulse outputs from the said gate G3, and these pulse outputs allow only one pulse output to be produced by complementing amplifier 53 during a given input signal period. In short, a pulse appears at the output of the amplifier 53 only after a gap in the signal input thereto, and gate G3 opens only once per input signal period. The arrangement shown in FIGURE 6 thus operates to effect a binary addition of the serial input A and input B trains appearing respectively at the terminals 54 and 55.

As has been discussed previously, the several non-complementing amplifiers shown in FIGURE 6 may be replaced by suitable passive delay means. The circuit may be even further simplified by the elimination of the complementing amplifier 64, provided a gate is inserted in the circuit between the output of non-complementing amplifier 60 and the input of complementing amplifier 61. This simplification, referring to FIGURE 6, will effect a still further simplification in that the buffers 62 and 65 shown, may be eliminated.

Figure 8:
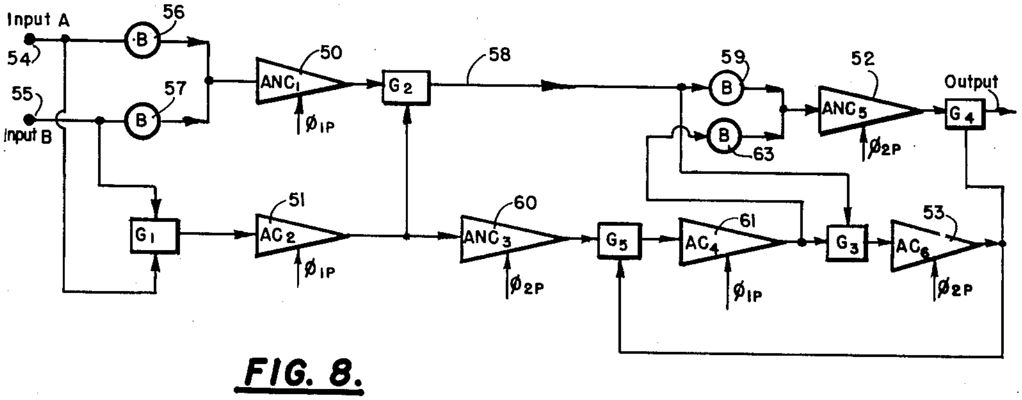
FIGURE 8 is a logical diagram illustrating a further possible circuit in accordance with the present invention.
Figure 9:
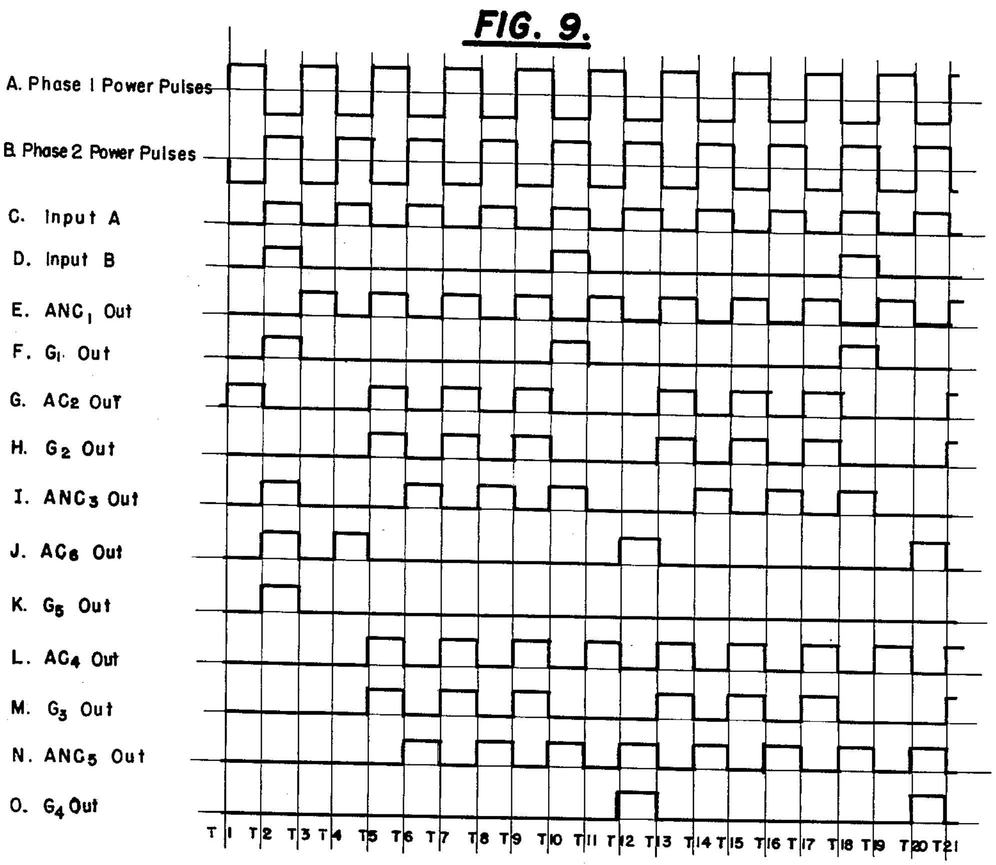
FIGURE 9 (A through O inclusive) are waveforms illustrating the operation of the serial adder shown in FIGURE 8.

Such a simplification has in fact been shown in the circuit of FIGURE 8 wherein the gate G5 is provided in lieu of the complementing amplifier 64 of FIGURE 6. Referring to the circuit of FIGURE 8, it will be noted that one input to the said gate G5 comprises the output of non-complementing amplifier 60, while the other input to the said gate G5 is the output of the complementing amplifier 53. The arrangement thus effected results in somewhat different internal operation of the adder structure but maintains the overall operation the same as before. Waveforms illustrative of the operation of the circuit of FIGURE 8 have been shown in FIGURE 9 for the assumed input A and input B pulses. It will be noted that, as before, the gate G2 passes three ouput pulses during the time interval $t5$ to $t10$, and that the gate G4, as before, passes but a single output pulse during the time interval $t12$ to $t13$. Again, to illustrate the operation of the circuit for an assumed non-periodic input, and thereby to illustrate the operation of gate G5, it has been assumed that non-complementing amplifier 50 does not produce an output during time interval $t1$ to $t2$ (FIGURE 9E). The precise electrical interrelation of the several components may be seen by an examination of the waveforms for the several time periods shown.

Figure 10:
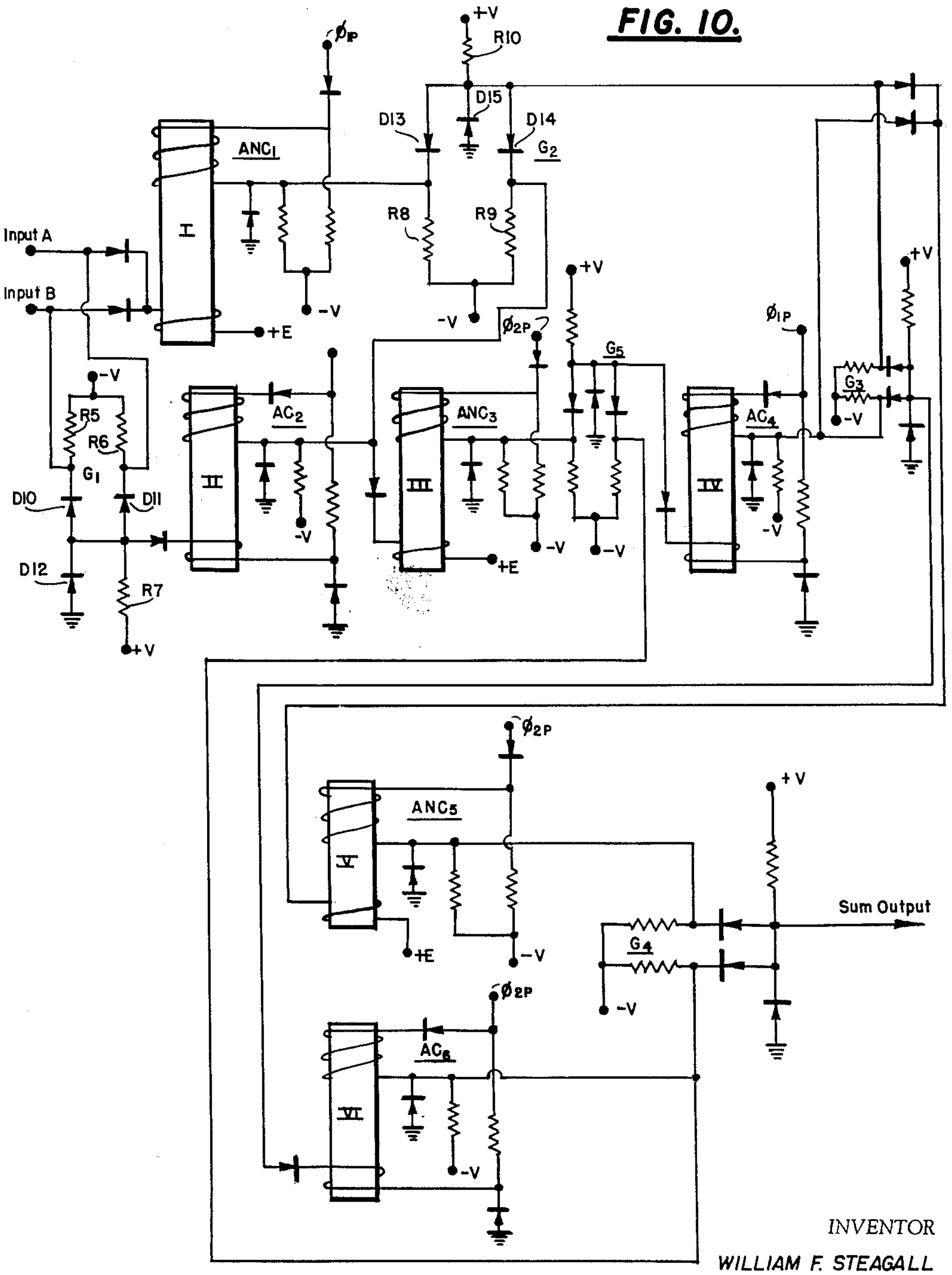
FIGURE 10 is a schematic diagram illustrative of one possible circuit in accordance with the logic of FIGURE 8.

Referring now to FIGURE 10, one possible schematic diagram employing the magnetic amplifiers of the type discussed in reference to FIGURES 2 and 4, has been shown in accordance with the logic of FIGURE 8. The magnetic amplifiers having cores I, II, III, IV, V, and VI, correspond respectively to the magnetic amplifiers 50, 51, 60, 61, 52 and 53, shown in FIGURE 8. The gate G1 comprises the resistors R5, R6, and R7, diodes D10 and D11 and clamping diode D12. Similarly, the gate G2 comprises resistors R8, R9 and R10, diodes D13 and D14, and clamping diode D15. The gates G3, G4 and G5 have been similarly identified in the arrangement of FIGURE 10.

Figure 11:
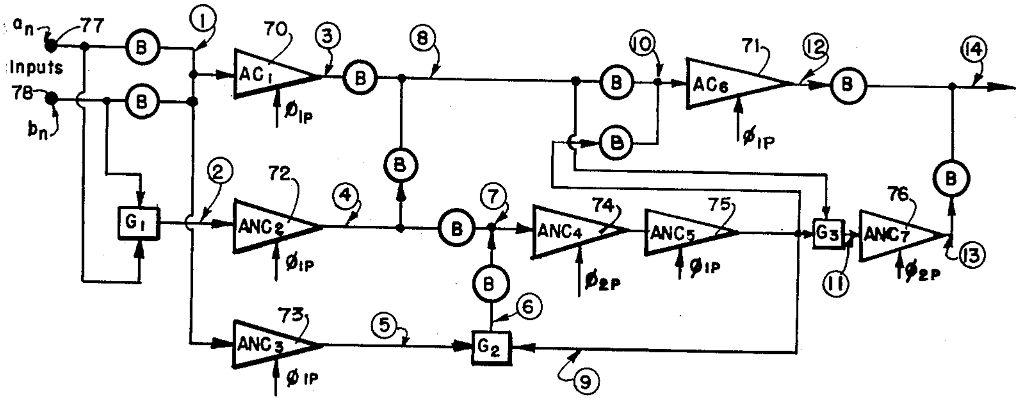
FIGURE 11 is a logical diagram of a further serial adder for binary numbers in accordance with the present invention.

A still further serial binary adder in accordance with the principles of the present invention has been disclosed in logical form in FIGURE 11. The particular arrangement comprises complementing amplifiers 70 and 71, in combination with non-complementing amplifiers 72, 73, 74, 75 and 76. Replacement of the several non-complementing amplifiers by equivalent passive delay means will in fact result in a serial binary adder employing but two magnetic amplifiers. Input pulses designated $a_n$ and $b_n$, and representative of the $n$th binary digit in each input train of digital pulses, appear respectively at input terminals 77 and 78, and these input pulses are coupled to the two inputs of a gate G1 as well as to the input of the complementing amplifier 70 and the non-complementing amplifier 73. The output of complementing amplifier 70, as before, is representative of the binary summation of a first half addition. The carry from the $(n-1)$th digital place to the $n$th digital place appears as one input to the gate G2 at the circuit point designated 9, and the carry from the $n$th digital place to the $(n+1)$th digital place of the binary addition appears as an input to the non-complementing amplifier 74 at the circuit point designated 7. The output of the gate G1 is further coupled via non-complementing amplifier 72 to the input of the said non-complementing amplifier 74 (via the said point 7) and the output of non-complementing amplifier 73 appears as the second input to the gate G2. The output of non-complementing amplifier 74 acts as a pulse input to the non-complementing amplifier 75 and the output of the said amplifier 75 is fed to the said first input of the gate G2, via the point 9, discussed previously, and is also fed to one input of the gate G3, and further, is fed to the input of the complementing amplifier 71 along with the pulse output representative of the first half addition summation, appearing at the point 8. The output of the said first half addition is further coupled to a second input to the said gate G3, the output of the said gate G3 being coupled via a non-complementing amplifier 76 to the output point 14 along with the output of the complementing amplifier 71. The particular operation of the circuit shown in FIGURE 11 may be best understood in the language of switching, or Boolean, algebra; and in this respect the following Boolean identities are adopted for the purposes of the subsequent discussion:

$$0+a=a$$
$$a0=0$$
$$1a=a$$
$$a+b=b+a$$
$$ab=ba$$
$$a+(b+c)=(a+b)+c$$
$$a(bc)=(ab)c$$
$$a(b+c)=ab+ac$$
$$a^n=a,\ n\geq 1$$
$$na=a,\ n\geq 1$$
$$a+1=1$$
$$a+bc=(a+b)(a+c)$$
$$a+\bar{a}=1$$
$$a\bar{a}=0$$
$$(\overline{ab})=\bar{a}+\bar{b}$$
$$\bar{a}+\bar{b}=\overline{ab}$$

In respect to the foregoing identities, which are well known in the art, the symbol + indicates alternation (or "buffing" in electrical nomenclature); the bar symbol, $\bar{a}$, for instance, indicates negation (or "complementing" in electrical nomenclature); and the apparent multiplication of two terms indicates conjunction (or "gating" in electrical nomenclature).

Referring now to the arrangement of FIGURE 11, it will be noted that the various significant points of the circuit have been identified by numerals 1 through 14 inclusive. The particular electrical condition of each of the said points 1 through 14 may therefore be discussed in the language of Boolean algebra, as follows, for each of the said points 1 through 14:

(1) $a_n+b_n$
(2) $a_nb_n$
(3) $\bar{a}_n\bar{b}_n$
(4) $a_nb_n$
(5) $a_n+b_n$
(8) $a_nb_n+\bar{a}_n\bar{b}_n$
(9) $c_{n-1}$
(6) $c_{n-1}(a_n+b_n)$
(7) $a_nb_n+c_{n-1}(a_n+b_n)=c_n$
(10) $c_{n-1}+a_nb_n+\bar{a}_n\bar{b}_n$
(11) $c_{n-1}\ (a_nb_n+\bar{a}_n\bar{b}_n)$
(12) $\bar{c}_{n-1}\ (a_n\bar{b}_n+\bar{a}_nb_n$
(13) $c_{n-1}\ (a_nb_n+\bar{a}_n\bar{b}_n$
(14) $c_{n-1}\ (a_nb_n+\bar{a}_n\bar{b}_n)+\bar{c}_{n-1}(a_n\bar{b}_n+\bar{a}_nb_n)=s_n$ In respect to the foregoing notations, it should be noted that $a_n$ is the $n$th binary digit of the addend; $b_n$ is the $n$th binary digit of the augend; the $n$th digit sum, $s_n$, occurs at the output as the $(n+1)$th inputs are applied; $c_{n-1}$ represents the carry from the $(n-1)$th place; and $c_n$ is the carry from the $n$th digital place to the $(n+1)$th digital place. It will be seen that the expression for the electrical status of the point 14 properly represents the sum $s_n$ of the binary addition of the input digits $a_n$ and $b_n$, appearing respectively at the input terminals 77 and 78.

Figure 12:
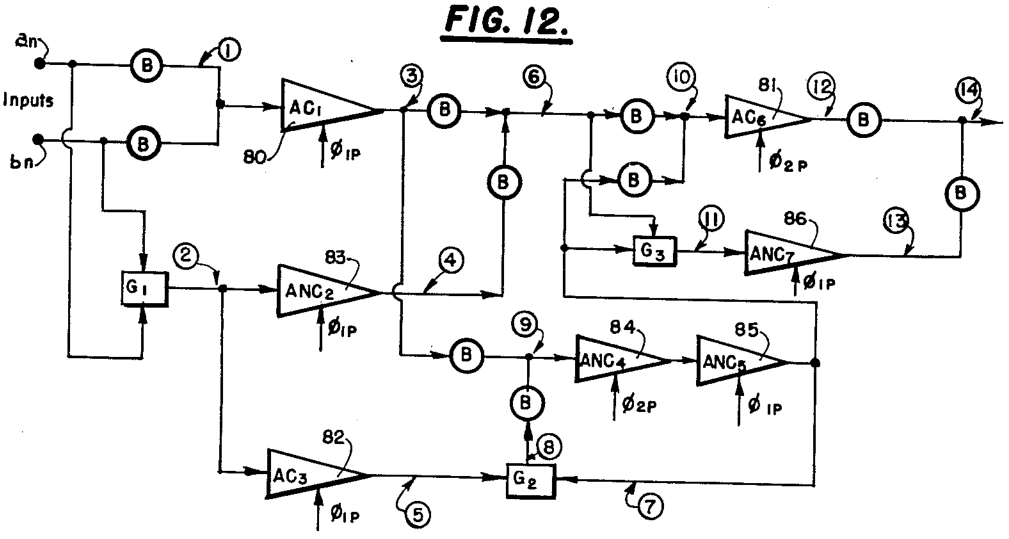
FIGURE 12 is a logical diagram of still another form of serial adder for binary numbers in accordance with the present invention and adapted to produce a complemented output.

A still further modification in accordance with the present invention has been illustrated in FIGURE 12, and the device shown therein is adapted to effect a serial binary addition with a complement output. The adder arrangement comprises complementing amplifiers 80, 81 and 82; non-complementing amplifiers 83, 84, 85 and 86; and the gates G1, G2 and G3 interconnected as shown. The particular arrangement shown in FIGURE 12 represents a modification of that discussed in reference to FIGURE 11 and, in particular, it will be noted that a complementing amplifier 82, fed from the output of the gate G1, has been substituted for the non-complementing amplifier 73 which had in turn been fed from the inputs at terminals 77 and 78. In addition, while in the arrangement of FIGURE 11 the inputs to the non-complementing amplifier 74 comprise the outputs of the gate G2 and of the non-complementing amplifier 72, in the arrangement of FIGURE 12 the input to the non-complementing amplifier 84 is comprised of the output of the gate G2 and the output of the complementing amplifier 80. In other respects, however, the arrangement of components is as has been discussed in reference to FIGURE 11. The particular arrangement shown in FIGURE 12 effects a serial binary adder which produces a complemented sum output in contradistinction to the arrangement of FIGURE 11 which produced an uncomplemented sum output. Such a complemented sum output is often desired in computation circuits and may be provided directly by the arrangement of FIGURE 12. Once more, the several significant points in the circuit of FIGURE 12 have been designated by the numerals 1 through 14 inclusive, and applying the Boolean identities referred to previously, it will be seen that the electrical status of each of the said points 1 through 14 may be represented as follows:

(1) $a_n+b_n$
(2) $a_nb_n$
(3) $\bar{a}_n\bar{b}_n$
(4) $a_nb_n$
(5) $\bar{a}_n+\bar{b}_n$
(6) $\bar{a}_n\bar{b}_n+a_nb_n$
(7) $\bar{c}_{n-1}$
(8) $\bar{c}_{n-1}(\bar{a}_n+\bar{b}_n)$
(9) $\bar{a}_n\bar{b}_n+\bar{c}_{n-1}(\bar{a}_n+\bar{b}_n)=\bar{c}_n$
(10) $\bar{c}_{n-1}+(\bar{a}_n\bar{b}_n+a_nb_n)$
(11) $\bar{c}_{n-1}(\bar{a}_n\bar{b}_n+a_nb_n)$
(12) $c_{n-1}(a_n\bar{b}_n+\bar{a}_nb_n)$
(13) $\bar{c}_{n-1}(\bar{a}_n\bar{b}_n+a_nb_n)$
(14) $c_{n-1}(a_n\bar{b}_n+\bar{a}_nb_n)+\bar{c}_{n-1}(\bar{a}_n\bar{b}_n+a_nb_n)=\bar{s}_n$ In particular, it will be noted that the output appearing at the point 14 of FIGURE 12 is a complemented sum output and the input to non-complementing amplifier 84 appearing at the point 9 is in fact a complement of the carry from the $n$th place. The serial adder of FIGURE 12, as well as serial adders of FIGURES 6 and 11, may, of course, be constructed of magnetic amplifiers of the types discussed in reference to FIGURES 2 and 4, and in accordance with the principles set forth in respect to FIGURES 8 and 10.

While I have described preferred embodiments of my invention, many variations will readily suggest themselves to those skilled in the art. In particular, the precise complementing and non-complementing amplifiers shown are merely illustrative and these amplifiers may in fact take a number of different forms which are all within the scope of the present invention. In this respect, for instance, reference is made to the copending application of Theodore H. Bonn and Robert D. Torrey, Serial No. 402,858 filed January 8, 1954, for: "Signal Translating Devices"; and to the copending application of John Presper Eckert, Jr. and Theodore H. Bonn, Serial No. 382,180, filed September 24, 1953, now Patent No. 2,892,998, for: "Signal Translating Device." These copending applications have each been assigned to the assignee of the instant application, and the teachings thereof may be readily employed in the practice of the present invention. Even further variations will be suggested to those skilled in the art and all such variations as are in accord with the principles discussed previously, are meant to fall within the scope of the present invention as set forth in the appended claims.

Having thus described my invention, I claim:

1. A serial adder comprising first and second half adders; each of said half adders having first and second signal inputs, a sum output terminal, and a carry output terminal; each said half adder comprising a pair of gating elements one of which is coupled to both said signal inputs, a non-complementing amplifier having its input coupled to both said signal inputs and having its output coupled via the other of said gating elements to said sum output terminal, and a complementing amplifier having its input coupled to said one gating element and having its output coupled to said carry output terminal as well as to said other gating element, whereby the outputs of each said half adder comprises a direct sum signal and a complemented carry signal at said sum and carry output terminals respectively; means coupling said sum output terminal of said first half adder to said non-complementing amplifier of said second half adder as well as to said one gating element of said second half adder, means including a delay means and a coupling amplifier of the complementing type for coupling said carry output terminal of said first half adder to said non-complementing amplifier of said second half adder as well as to said one gating element of said second half adder said delay means and said coupling amplifier each having a delay equal to the delay through said non-complementing amplifiers of said half-adders, and means for coupling the carry output terminal of said second half-adder to said coupling amplifier whereby said coupling amplifier is operative to convert the complemented carry output of both said first and second half adders to a non-complemented carry input to said second half adder.

2. The combination of claim 1 wherein said last-named means comprises a further gating element having one of its inputs coupled to the carry output terminal of said second half adder and its other input coupled to the output of the delay means, and having its output coupled to the input of said coupling amplifier.

3. A serial adder comprising first and second half adders each of which includes an input as well as means responsive to signals at said input producing a direct sum signal at a sum output terminal and a complemented carry signal at a carry output terminal, means for coupling serial signals, to be added, to the input of said first half adder, means for coupling the direct sum signal produced by said first half adder to the input of said second half adder, and means for coupling the complemented carry signals produced by both said first and second half adders to the input of said second half adder, said last-named means including a complementing amplifier having a delay equal to the delay through said means producing a direct sum signal whereby the said complementing amplifier is operative to convert said complemented carry signals of both said half adders to direct carry signals at the input of said second half adder.

4. A serial adder comprising first and second signal inputs respectively receiving first and second pulse trains characteristic of first and second binary numbers, first gating means coupled to said first and second signal inputs and producing an output pulse in response to the simultaneous occurrence of pulses at said first and second signal inputs, a first pulse type magnetic amplifier coupled to the output of said first gating means and selectively responsive to outputs therefrom, a second pulse type magnetic amplifier having its input coupled to both of said first and second signal inputs and responsive to a pulse applied to either of said signal inputs, second gating means, further pulse type magnetic amplifier means coupled between the output of said first magnetic amplifier and one input of said second gating means, said further magnetic amplifier means comprising a complementing magnetic amplifier and delay means connected in series with one another, third gating means interposed between said delay means and said complementing magnetic amplifier and means coupling the output of said complementing magnetic amplifier to one input of said second gating means, a third pulse type magnetic amplifier coupled to the output of said second gating means and responsive to output therefrom, a fourth pulse type magnetic amplifier coupled to said second magnetic amplifier and to said further magnetic amplifier means and responsive to the output state of each, means selectively coupling the output of said second magnetic amplifier to another input tof said second gating means, and output means coupled to the outputs of said third and fourth magnetic amplifiers.

5. A serial adder comprising first and second half-adders, each of said half-adders having first and second input terminals, delay means coupled to said first and second input terminals for producing output pulses in response to input pulses supplied to either of said terminals and a magnetic amplifier coupled to said first and second input terminals for producing output pulses in response to the absence of concurrent input pulses being supplied to said first and second input terminals, means feeding output pulses from said delay means of said first half-adder to said first input terminal of said second half-adder, and means for feeding output pulses from the magnetic amplifiers of both said first and second half-adders to said second input terminal of said second half-adder, said last-named means including a gate, other delay means, a complementing amplifier means having a delay and means feeding output pulses from the magnetic amplifier of said first half-adder through said other delay means to one input of said gate and output pulses from the magnetic amplifier of said second half-adder to the other input of said gate, the output of said gate being connected to the input of said complementing amplifier, whereby the output of said complementing amplifier produces a pulse at said second input terminal of said second half-adder during the absence of concurrent pulses from said other delay means and the magnetic amplifier of said second half-adder.

6. The serial adder of claim 4 in which the delay means of said half-adders are non-complementing magnetic amplifiers.

7. The serial adder of claim 5 in which said other delay means is a non-complementing magnetic amplifier.

8. A serial adder comprising first and second half-adders, each of said half-adders having first and second input terminals, a sum output producing output pulses in response to input pulses applied to either of said input terminals and a complemented carry output producing output pulses in response to the absence of concurrent input pulses being supplied to said input terminals, means coupling said sum output from said first half-adder to said first input terminal of said second half-adder, and means coupling said complemented carry output of both said first and second half-adders to said second input terminal of said second half-adder, said last-named means including delay means, a gate, complementing amplifier means and means coupling the complemented carry output of said first half-adder through said delay means to one input of said gate and means coupling the complemented carry output of said second half-adder to the other input of said gate, the output of said gate being connected to the input of said complementing amplifier means, whereby the output of said complementing amplifier means produces pulses at said second terminal of said second half-adder in the absence of concurrent complemented carry outputs from said first half-adder via said delay means and from said second half-adder.

References Cited in the file of this patent

UNITED STATES PATENTS

| | | |
|---|---|---|
| 2,694,521 | Newman et al. | Nov. 16, 1954 |
| 2,696,347 | Lo | Dec. 7, 1954 |
| 2,781,504 | Canepa | Feb. 12, 1957 |
| 2,803,401 | Nelson | Aug. 20, 1957 |
| 2,806,648 | Rutledge | Sept. 17, 1957 |
| 2,913,593 | Kaufmann | Nov. 17, 1959 |

(Other references on following page)

OTHER REFERENCES

EDVAC (2) Report, Moore School of Electrical Engineering, University of Pa., June 30, 1946, pages 1-1-2 to 1-1-5 and Sheet PY-0-101 relevant.

High Speed Computing Device, McGraw-Hill 1950 (Fig. 13.5 and page 276).

Haynes: "Magnetic Cores as Elements of Digital Computing Systems," PhD Thesis, University of Illinois, 1950.

Booth: "The Physical Realization of an Electronic Digital Computer," Electronic Engineering, December 1950, pp. 492–498.

Gray: "Logical Description of Some Digital-Computer Adders and Counters," Proc. IRE, January 1950, pp. 29–32.